US011566297B2

(12) United States Patent
Migita et al.

(10) Patent No.: US 11,566,297 B2
(45) Date of Patent: Jan. 31, 2023

(54) MAGNESIUM OXIDE FOR ANNEALING SEPARATORS, AND GRAIN-ORIENTED MAGNETIC STEEL SHEET

(71) Applicant: TATEHO CHEMICAL INDUSTRIES CO., LTD., Ako (JP)

(72) Inventors: Tsubasa Migita, Ako (JP); Yutaka Hiratsu, Ako (JP); Tadasuke Kamei, Ako (JP)

(73) Assignee: TATEHO CHEMICAL INDUSTRIES CO., LTD., Ako (JP)

( * ) Notice: Subject to any disclaimer, the term of this patent is extended or adjusted under 35 U.S.C. 154(b) by 664 days.

(21) Appl. No.: 16/087,078

(22) PCT Filed: Mar. 16, 2017

(86) PCT No.: PCT/JP2017/010688
§ 371 (c)(1),
(2) Date: Sep. 20, 2018

(87) PCT Pub. No.: WO2017/169851
PCT Pub. Date: Oct. 5, 2017

(65) Prior Publication Data
US 2020/0123627 A1  Apr. 23, 2020

(30) Foreign Application Priority Data
Mar. 30, 2016  (JP) .............................. JP2016-067690

(51) Int. Cl.
| C01F 5/02 | (2006.01) |
| C21D 1/70 | (2006.01) |
| H01F 1/147 | (2006.01) |
| C21D 8/12 | (2006.01) |
| C21D 9/46 | (2006.01) |
| C21D 3/04 | (2006.01) |
| C21D 6/00 | (2006.01) |

(52) U.S. Cl.
CPC .............. *C21D 8/1283* (2013.01); *C01F 5/02* (2013.01); *C21D 1/70* (2013.01); *C21D 3/04* (2013.01); *C21D 6/008* (2013.01); *C21D 8/1222* (2013.01); *C21D 8/1233* (2013.01); *C21D 9/46* (2013.01); *H01F 1/147* (2013.01); *C01P 2002/52* (2013.01); *C01P 2006/12* (2013.01)

(58) Field of Classification Search
CPC .... C01F 5/02; C01P 2002/52; C01P 2006/12; C21D 1/70; C21D 3/04; C21D 6/008; C21D 8/12; C21D 8/1222; C21D 8/1233; C21D 8/1283; C21D 9/46; C22C 38/04; C23C 22/00; H01F 1/147
See application file for complete search history.

(56) References Cited

U.S. PATENT DOCUMENTS

| 4,249,966 A * | 2/1981 | Ichida ..................... C21D 9/46 148/113 |
| 9,194,016 B2 | 11/2015 | Okubo | |
| 2003/0136467 A1 | 7/2003 | Hiratsu | |
| 2014/0246124 A1* | 9/2014 | Okubo ..................... C22C 38/04 148/22 |

FOREIGN PATENT DOCUMENTS

| CA | 1018875 A | 10/1977 | |
| CN | 103857827 A * | 6/2014 | ............... C21D 1/68 |
| EP | 3438292 A1 | 2/2019 | |
| JP | 54-14566 B2 | 6/1979 | |
| JP | 57-45472 B2 | 9/1982 | |
| JP | S5745472 B2 | 9/1982 | |
| JP | 4-25349 B2 | 4/1992 | |
| JP | 6-101059 A | 4/1994 | |
| JP | 2650817 B2 | 9/1997 | |
| JP | 2690841 B2 | 12/1997 | |
| JP | 10-88244 A | 4/1998 | |
| JP | 11158558 A * | 6/1999 | |
| JP | H11158558 | 6/1999 | |
| JP | 3021241 B2 | 3/2000 | |
| JP | 3043975 B2 | 5/2000 | |
| JP | 3091096 B2 | 9/2000 | |
| JP | 2001303258 A * | 10/2001 | |
| JP | 2004-176144 A | 6/2004 | |
| JP | 3536775 B2 | 6/2004 | |
| JP | 2004-238668 A | 8/2004 | |
| JP | 3650525 B2 | 5/2005 | |

(Continued)

OTHER PUBLICATIONS

Extended European Search Report dated Aug. 16, 2019, issued in corresponding EP Application No. 17774395.2, 7 pages.
New Ceramic Powder Handbook, Science Forum, Inc., issued Jul. 25, 1983, Cover page and pp. 5-16, 374-377, Imprint and partial English translation, 19 pages.
Arakawa, Masafumi et al., "An Automatic Apparatus for the Particle Size Determination of Powder by Air-permeability Method", The Society of Materials Science, Japan, Material Testing, vol. 7, No. 56, pp. 267-271, with partial English translation (https://www.jstage.jst.go.jp/article/jsms1952/7/56/7_56_267/_article/-char/ja/), 6 pages.
JP Third Party Opposition No. 2019-700648, filed on Aug. 19, 2019 in connection with corresponding JP Patent No. 6472767, 144 pages.
English translation of JP Opposition No. 2019-700648, 32 pages.
KIPO Office Action dated Mar. 19, 2021, issued in corresponding Korean Patent Application No. 10-2018-7030371, with machine translation.

(Continued)

*Primary Examiner* — Jenny R Wu
(74) *Attorney, Agent, or Firm* — Lewis Roca Rothgerber Christie LLP

(57) ABSTRACT

An object of the present invention is to provide magnesium oxide for an annealing separator which is useful for obtaining grain-oriented electromagnetic steel sheets with excellent magnetic properties and insulating properties. To resolve the above object, an aspect of the present invention resides in magnesium oxide for an annealing separator which has a BET specific surface area of $12.0 \times 10^3$ to $25.0 \times 10^3$ $m^2 \cdot kg^{-1}$ and a Blaine specific surface area of $2.0 \times 10^3$ to $7.0 \times 10^3$ $m^2 \cdot kg^{-1}$.

4 Claims, No Drawings

(56) References Cited

FOREIGN PATENT DOCUMENTS

| | | |
|---|---|---|
| JP | 3892300 B2 | 12/2006 |
| JP | 2008260668 A | 10/2008 |
| JP | 2008260668 A * | 10/2008 |
| JP | 4192282 B2 | 12/2008 |
| JP | 2012072004 A | 4/2012 |
| JP | 2015-196829 A | 11/2015 |
| JP | 2017179461 A | 10/2017 |
| WO | WO2013051270 A1 | 4/2013 |

OTHER PUBLICATIONS

Arvaniti, Eleni C., "Determination of particle size, surface area, and shape of supplementary cementitious materials by different techniques", Materials and Structures (2015) 48:3687-3701 (also D4 to EP Opposition listed below).

Notice of Opposition dated Mar. 31, 2021 in corresponding EP Application No. 17774395.2. Declarations and Citations Labeled D1-12e listed separately (Citation D1 was previously cited).

English machine translation of previously cited Jp 11-158558A, published Jun. 15, 1999.

Japanese Industrial Standard, Jis R 5201 (2015), "Physical testing methods for cement", Japanese Industrial Standards Committee, Japan.

Packing List/Certificate of Quantity/Weight for Export: 167977, public prior use, sale to Aperam 1, dated Nov. 11, 2015.

Packing List/Certificate of Quantity/Weight for Export: 168560, public prior use, sale to Tateho / Novo Steel, dated Nov. 24, 2025.

Packing List/Certificate of Quantity/Weight for Export: 167977, public prior use, sale to Aperam 2 dated Dec. 12, 2015.

Packing List/Certificate of Quantity/Weight for Export: 167977, public prior use, sale to ArcelorMittal dated Jan. 17, 2016.

Declaration of Mr. Rozen on analysis products before priority date, with Appendices A1 through E.

Declaration of Mr. Rozen about recent products, with Appendices A-C.

ThussenKrupp Public Prior Use with Appendices.

Further Evidence of Scora Products Sold to ThyssenKrupp with Appendices A-D.

Consolidated List of Cited Documents to Notice of Opposition dated Mar. 31, 2021 filed in corresponding EP Application No. 17774395.2.

* cited by examiner

MAGNESIUM OXIDE FOR ANNEALING SEPARATORS, AND GRAIN-ORIENTED MAGNETIC STEEL SHEET

CROSS-REFERENCE TO RELATED APPLICATION(S)

This application is a National Phase Patent Application and claims priority to and the benefit of International Application Number PCT/JP2017/010688, filed on Mar. 16, 2017, which claims priority to and the benefit of Japanese Patent Application Number 2016-067690, filed Mar. 30, 2016, the entire contents of all of which are incorporated herein by reference.

TECHNICAL FIELD

The present invention relates to magnesium oxide for an annealing separator and to a grain-oriented electromagnetic steel sheet.

BACKGROUND ART

Grain-oriented electromagnetic steel sheets used for transformers and generators are generally manufactured by hot-rolling silicon steel containing about 3% silicon (Si), cold-rolling the steel sheet to a final thickness, and decarburization-annealing and finish-annealing the steel sheet. In the decarburization-annealing (primary recrystallization annealing), a silicon dioxide film is formed on the steel sheet surface, slurry containing magnesium oxide for an annealing separator is applied onto the surface and is dried, and the steel sheet is coiled and is subjected to finish-annealing in which silicon dioxide ($SiO_2$) reacts with magnesium oxide (MgO) to form a forsterite ($Mg_2SiO_4$) film on the surface of the steel sheet. This forsterite film imparts tension to the surface of the steel sheet, reduces the iron loss to enhance magnetic properties, and also gives insulating properties to the steel sheet.

To enhance the characteristics of grain-oriented electromagnetic steel sheets, trace components that are contained in magnesium oxide for an annealing separator have been studied. Some trace components that are added in controlled amounts to magnesium oxide for an annealing separator are calcium oxide (CaO), boron (B), sulfite ($SO_3$), fluorine (F) and chlorine (Cl). Further, attempts to investigate not only the contents of trace components but also the structures of compounds containing trace component elements in magnesium oxide for an annealing separator have been made.

For example, Patent Literature 1 discloses magnesium oxide for an annealing separator having specific contents of CaO and B. Further, Patent Literature 2 discloses magnesium oxide for an annealing separator which contains specific amounts of chlorides such as of Mg and Ca and has a specific ratio of B to the chlorides. Patent Literature 3 and Patent Literature 4 disclose magnesium oxide for an annealing separator which have specific contents of CaO, $SO_3$, halogen and B in the magnesium oxide for an annealing separator. There are researches which specify other properties of magnesium oxide for an annealing separator. For example, Patent Literature 5 discloses magnesium oxide for an annealing separator having many controlled physical properties including the contents of CaO, $CO_2$, $SO_3$, K, Na and B.

Patent Literature 6 discloses a method for manufacturing a grain-oriented electromagnetic steel sheet which uses magnesium oxide having specific contents of Cl and $SO_3$. Patent Literature 7 discloses an annealing separator for a grain-oriented electromagnetic steel sheet which has specific F and Cl contents and specific properties.

Some inventions have been made which focus attention on, besides trace components, the activity based on the reaction rate of magnesium oxide particles with an acid, namely, the citric acid activity (CAA). The CAA is expressed as the time required for a 0.4 N aqueous citric acid solution containing phenolphthalein as an indicator to be neutralized when it is mixed with a final reaction equivalent of magnesium oxide and the mixture is stirred at a predetermined temperature (for example, 303 K). It is empirically known that the CAA can serve as an index for the evaluation of magnesium oxide used as an annealing separator for grain-oriented electromagnetic steel sheets.

Patent Literature 8 discloses an invention related to the distribution of CAA at specific reaction equivalents of magnesium oxide. Specifically, the invention is directed to magnesium oxide for an annealing separator which has an activity so controlled that the CAA falls in a narrow range in each case where the final reaction degree is 20%, 40%, 60% and 70%. Further, Patent Literature 9 and Patent Literature 10 disclose inventions directed to magnesium oxide for an annealing separator wherein the activity at 40% CAA and 80% CAA and other properties such as particle size and specific surface area are limited to predetermined ranges. Furthermore, Patent Literature 11 discloses an invention directed to an annealing separator for grain-oriented electromagnetic steel sheets in which properties such as 70% CAA, 70% CAA/40% CAA ratio, particle size and specific surface area are limited to predetermined ranges. In all of these inventions, the hydratability and reactivity of magnesium oxide particles are controlled.

CITATION LIST

Patent Literature

Patent Literature 1: Japanese Patent Publication No. H04-025349
Patent Literature 2: Japanese Patent No. 2690841
Patent Literature 3: Japanese Patent Publication No. S54-014566
Patent Literature 4: Japanese Patent No. 3043975
Patent Literature 5: Japanese Patent Application Publication No. H10-88244
Patent Literature 6: Japanese Patent No. 3021241
Patent Literature 7: Japanese Patent No. 3091096
Patent Literature 8: Japanese Patent Publication No. S57-045472
Patent Literature 9: Japanese Patent No. 2650817
Patent Literature 10: Japanese Patent No. 4192282
Patent Literature 11: Japanese Patent No. 3650525

SUMMARY OF INVENTION

Technical Problem

The magnetic properties and insulating properties of grain-oriented electromagnetic steel sheets, as well as their market value, are affected by the performance of forsterite film, specifically, the following four points: (a) formability of forsterite film (forsterite film formation ratio), (b) film appearance, (c) film adhesion and (d) acid-removability of unreacted magnesium oxide. In other words, the properties and value of grain-oriented electromagnetic steel sheets depend on the performance of magnesium oxide for an annealing separator which is used to form a forsterite film.

Unfortunately, the conventional magnesium oxides for an annealing separator are unreliable on account of the facts that the occurrence of defective films on grain-oriented electromagnetic steel sheets cannot be perfectly avoided, and the effects cannot be achieved constantly. Thus, magnesium oxide for an annealing separator which possesses sufficient performance is not yet developed.

As described earlier, Patent Literatures 1 to 5 disclose the attempts to investigate the structures of trace element compounds contained in magnesium oxides for annealing separators. However, the use of the magnesium oxides for an annealing separator described in these literatures results in forsterite films having poor adhesion or low acid-removability of unreacted magnesium oxide.

The magnesium oxides for an annealing separator described in Patent Literatures 6 and 7 are developed focusing on the effect of halogen, in particular fluorine, in promoting the formation of forsterite film. The magnesium oxides described in these literatures show constant effects of the formation of forsterite film, but their effects are still unsatisfactory.

As discussed above, many attempts to control various physical properties of magnesium oxide for an annealing separator so as to attain constant effects of promoting the formation of forsterite film and to improve the quality of forsterite film have been made.

However, there has been a demand for a further enhancement in quality so that the magnesium oxide for an annealing separator will satisfy the requirements ((a) to (d) described above) sufficiently.

The activity of magnesium oxide indicated by CAA is an indicator for the reactivity in the solid phase-liquid phase reaction between magnesium oxide and citric acid. In this solid phase-liquid phase reaction, the surface free energy is higher and the activity is enhanced with increasing number of reaction sites of the solid phase, that is, with decreasing particle size of magnesium oxide and with increasing specific surface area thereof. However, powdery particles such as magnesium oxide do not always exist as unit particles, and in many cases are aggregated and bonded to form agglutination of particles depending on production methods. In the case where the particles are collections of aggregated and agglutinated particles, the measured value of CAA does not reflect the structure of the particles as aggregates. Thus, the reactivity of an annealing separator cannot be represented accurately by CAA alone.

Further, the CAA only simulates empirically the reactivity in the solid phase-solid phase reaction between silicon dioxide and magnesium oxide which actually occurs on the surface of an electromagnetic steel sheet, based on the reactivity in the solid phase-liquid phase reaction between magnesium oxide and citric acid. Unlike a solid phase-liquid phase reaction, the forsterite formation reaction, which is a solid phase-solid phase reaction, will be significantly affected by the aggregate structure of magnesium oxide particles, typically, for example, the number of contacts between the silicon dioxide film and the magnesium oxide particles. Specifically, when the number of contacts affected by the structure of aggregated particles is small, the reaction will be insufficient even when the magnesium oxide particles have active surface. On the other hand, when a large number of contacts exist, the sufficient reaction can be occurred even when the surface of magnesium oxide particles is inactive.

As described above, the CAA used as an indicator for the characteristics of an annealing separator for an electromagnetic steel sheet is usable for the evaluation of reactivity of magnesium oxide only under limited conditions, and this indicator cannot be always said to evaluate the reactivity in a solid phase-solid phase reaction which actually occurs on the surface of an electromagnetic steel sheet. Thus, a technique which controls the solid phase-solid phase reaction in consideration of the aggregate structure of powdery particles offers a possibility that magnesium oxide, even if it shows poor activity according to the CAA evaluation, is found to have a particle aggregate structure suitable for an annealing separator. Further, such a technique which controls the solid phase-solid phase reaction in consideration of the aggregate structure of powdery particles offers a possibility that magnesium oxide which can give grain-oriented electromagnetic steel sheets with enhanced magnetic properties and insulating properties can be selected from among magnesium oxides evaluated as having good activity according to the CAA evaluation.

Therefore, it is an object of the present invention to provide magnesium oxide for an annealing separator which is useful for obtaining a grain-oriented electromagnetic steel sheet with excellent magnetic properties and insulating properties. Specifically, an object of the present invention is to provide magnesium oxide for an annealing separator which can form a forsterite film showing excellent performance in forsterite film formation ratio, film appearance, film adhesion and acid-removability of unreacted magnesium oxide on the surface of a steel sheet.

Solution to Problem

The present inventors have found that a grain-oriented electromagnetic steel sheet with excellent magnetic properties and insulating properties can be obtained by controlling a BET specific surface area and a Blaine specific surface area of magnesium oxide for an annealing separator to the predetermined ranges.

An aspect of the present invention resides in magnesium oxide for an annealing separator having a BET specific surface area of $12.0 \times 10^3$ to $25.0 \times 10^3$ $m^2 \cdot kg^{-1}$ and a Blaine specific surface area of $2.0 \times 10^3$ to $7.0 \times 10^3$ $m^2 \cdot kg^{-1}$.

The BET specific surface area corresponds to the specific surface area including the surface area of primary particles forming aggregated particles. In contrast, the Blaine specific surface area corresponds to the specific surface area of the aggregated particles alone without the surface area of the primary particles forming the aggregated particles. Thus, the structures of primary particles and aggregated particles can be controlled by controlling the BET specific surface area and the Blaine specific surface area to the predetermined ranges. In the magnesium oxide for an annealing separator of the present invention, by controlling the structures of primary particles and aggregated particles, it become possible to control the solid phase-solid phase reaction between the magnesium oxide and the surface silicon dioxide film appropriately. As a result, the use of the magnesium oxide for an annealing separator makes it possible to obtain a grain-oriented electromagnetic steel sheet having superior magnetic properties and insulating properties. Specifically, a forsterite film showing excellent performance in forsterite film formation ratio, film appearance, film adhesion and acid-removability of unreacted magnesium oxide can be formed on a surface of a steel sheet.

Preferably, the magnesium oxide for an annealing separator of the present invention contains 0.04 to 0.15 mass % boron and has a chlorine content of not more than 0.05 mass %. By limiting the contents of boron and chlorine to the predetermined ranges, the magnesium oxide for an annealing separator which can be used for obtaining a grain-oriented electromagnetic steel sheet with excellent magnetic properties and insulating properties can be obtained more reliably.

Another aspect of the present invention resides in an annealing separator including the above magnesium oxide for an annealing separator. By the use of the annealing separator of the present invention, a grain-oriented electromagnetic steel sheet with excellent magnetic properties and insulating properties can be manufactured.

Another aspect of the present invention resides in a method for manufacturing a grain-oriented electromagnetic steel sheet, comprising the step of forming a silicon dioxide film on a steel sheet surface, and the step of forming a forsterite film on the steel sheet surface by applying the aforementioned annealing separator onto the surface of the silicon dioxide film, and annealing the steel sheet. By the method of the present invention, a grain-oriented electromagnetic steel sheet with excellent magnetic properties and insulating properties can be manufactured.

Advantageous Effects of Invention

According to the present invention, the magnesium oxide for an annealing separator which can be used for obtaining a grain-oriented electromagnetic steel sheet with excellent magnetic properties and insulating properties can be provided. Specifically, according to the present invention, the magnesium oxide for an annealing separator can form a forsterite film showing excellent performance in forsterite film formation ratio, film appearance, film adhesion and acid-removability of unreacted magnesium oxide on the surface of a steel sheet.

DESCRIPTION OF EMBODIMENTS

The magnesium oxide for an annealing separator of the present invention has a BET specific surface area of $12.0 \times 10^3$ to $25.0 \times 10^3$ $m^2 \cdot kg^{-1}$ and a Blaine specific surface area of $2.0 \times 10^3$ to $7.0 \times 10^3$ $m^2 \cdot kg^{-1}$. Here, the BET specific surface area is the specific surface area measured by the nitrogen gas adsorption method (the BET method), and the Blaine specific surface area is the specific surface area measured by the Blaine method described in JIS R5201: 2015"8.1 Specific surface area test".

In the Blaine method, the specific surface area is measured by passing air through a layer of packed particles. Because of this fact, the method cannot measure the surface area of fine pores which are not accessible for the flow of air. Thus, the Blaine method can measure the specific surface area (the Blaine specific surface area) of aggregated particles alone without the surface area of primary particles forming the aggregated particles.

The measurement of BET specific surface area by the BET method can determine even the surface area of fine pores in aggregated particles. Thus, the specific surface area (the BET specific surface area) which includes the surface area of primary particles forming aggregated particles can be measured.

When the BET specific surface area of the magnesium oxide is less than $12.0 \times 10^3$ $m^2 \cdot kg^{-1}$, the primary particle size of the magnesium oxide is so large that the magnesium oxide particles show poor reactivity, causing a decrease in (a) forsterite film formation ratio. Further, in this case, residues will remain after the removal of the magnesium oxide with acids because of the particles being coarse. That is, (d) acid-removability of unreacted magnesium oxide from the forsterite film is deteriorated.

When the BET specific surface area of the magnesium oxide is larger than $25.0 \times 10^3$ $m^2 \cdot kg^{-1}$, the primary particle size of the magnesium oxide is so small that the magnesium oxide particles show too high reactivity and fail to form a uniform forsterite film.

Consequently, (b) film appearance and/or (c) adhesion of the forsterite film on a grain-oriented electromagnetic steel sheet is deteriorated.

The BET specific surface area of the magnesium oxide is preferably $12.0 \times 10^3$ to $23.0 \times 10^3$ $m^2 \cdot kg^{-1}$, and more preferably $14.0 \times 10^3$ to $20.0 \times 10^3$ $m^2 \cdot kg^{-1}$.

When the Blaine specific surface area of the magnesium oxide is less than $2.0 \times 10^3$ $m^2 \cdot kg^{-1}$, the aggregated particles of the magnesium oxide are so coarse and have less contacts with the steel sheet, and become less reactive, causing a decrease in (a) forsterite film formation ratio. Further, because the forsterite film containing coarse particles of aggregated magnesium oxide is formed, the thickness is nonuniform. Consequently, (b) film appearance and/or (c) adhesion of the forsterite film on a grain-oriented electromagnetic steel sheet is deteriorated.

When the Blaine specific surface area of the magnesium oxide is larger than $7.0 \times 10^3$ $m^2 \cdot kg^{-1}$, the aggregated particles of the magnesium oxide are so small in particle size and have more contacts with the steel sheet, and become too reactive, failing to form a uniform forsterite film. Consequently, (b) film appearance and/or (c) adhesion of the forsterite film on a grain-oriented electromagnetic steel sheet is deteriorated.

The Blaine specific surface area of the magnesium oxide is preferably $2.5 \times 10^3$ to $6.0 \times 10^3$ $m^2 \cdot kg^{-1}$, and more preferably $3.0 \times 10^3$ to $5.0 \times 10^3$ $m^2 \cdot kg^{-1}$.

As described above, by controlling the BET specific surface area and the Blaine specific surface area of aggregated particles of the magnesium oxide of the present invention, the magnesium oxide is enabled to achieve with high reliability an outstanding forsterite film-forming ability that conventional magnesium oxides for an annealing separator have not succeeded. Here, the outstanding forsterite film-forming ability is indicated by the levels of forsterite film formation ratio, film appearance, film adhesion and acid-removability of unreacted magnesium oxide in the manufacturing of a grain-oriented electromagnetic steel sheet.

By using the magnesium oxide for an annealing separator of the present invention, a grain-oriented electromagnetic steel sheet having excellent insulating properties and magnetic properties can be manufactured.

In the present invention, the magnesium oxide may be produced by a known method. For example, the magnesium oxide may be produced in such a manner that slurry of calcium hydroxide is added to and reacted with an aqueous solution of magnesium chloride as a raw material to form magnesium hydroxide, and the magnesium hydroxide is filtrated, washed with water, dried, and calcined in a heating furnace to give magnesium oxide, followed by crushing the resultant magnesium oxide to a desired particle size.

The calcium hydroxide may be replaced by an alkaline compound having hydroxyl such as sodium hydroxide and potassium hydroxide. Alternatively, the magnesium oxide may be produced by the Aman process in which an magnesium chloride-containing aqueous solution such as seawater, brine and bittern is introduced into a reactor, and magnesium oxide and HCl are formed directly at 1773 to 2273 K, followed by crushing the resultant magnesium oxide to desired particle size and specific surface area.

Still alternatively, the magnesium oxide may be produced by hydrating magnesium oxide resulting from the calcination of mineral magnesite, and calcining the resultant magnesium hydroxide, followed by crushing the resultant magnesium oxide to desired particle size and specific surface area.

In the present invention, the BET specific surface area and the Blaine specific surface area of the magnesium oxide may be adjusted as follows. The BET specific surface area and the Blaine specific surface area of the magnesium oxide may be adjusted by adjusting the reaction temperature and the concentration of an alkali source in a manufacturing process of magnesium hydroxide, and thereby controlling the primary particle size and secondary particle size of the magnesium hydroxide. Alternatively, the BET specific surface area and the Blaine specific surface area of the magnesium oxide may be adjusted by controlling the temperature and time of the calcination of magnesium hydroxide having a controlled particle size. Still alternatively, the BET specific surface area and the Blaine specific surface area may be adjusted by measuring the BET specific surface area and the Blaine specific surface area after a crushing operation, and performing calcination several times. Further, the BET specific surface area and the Blaine specific surface area of the magnesium oxide may be adjusted by crushing calcined magnesium oxide with use of a crushing machine such as a jaw crusher, a gyratory crusher, a cone crusher, an impact crusher, a roll crusher, a cutter mill, a stamp mill, a ring mill, a roller mill, a jet mill, a hammer mill, a rotary mill, a vibration mill, a planetary mill and a ball mill.

The BET specific surface area and the Blaine specific surface area of the magnesium oxide may be adjusted by classifying the magnesium oxide particles with a classifier so that the desired BET specific surface area and the Blaine specific surface area will be obtained.

The optimum conditions of the crushing machine for obtaining the range of the specific surface areas of the magnesium oxide of the present invention are variable depending on the type and performance (power) of the crushing machine. When the crushing intensity increases, the BET specific surface area and the Blaine specific surface area increase. In contrast, when the crushing intensity decreases, the BET specific surface area and the Blaine specific surface area decrease. The use of a classifier is not always necessary, but the combined use allows the surface areas to be controlled within a wider range.

In the case where the magnesium oxide obtained by the aforementioned method is measured and turns out to have an excessively large BET specific surface area and/or an excessively large Blaine specific surface area, the BET specific surface area and the Blaine specific surface area of the magnesium oxide may be adjusted by combining and mixing the magnesium oxide with other magnesium oxide having a smaller BET specific surface area and/or a smaller Blaine specific surface area.

In the present invention, the contents of trace components may be controlled during the steps of production of a crude product. In such a case, trace components may be added in wet manner. Specifically, for example, using an aqueous magnesium chloride solution having the contents of trace components analyzed in advance as a raw material, during the step of forming magnesium hydroxide by adding an alkaline aqueous solution or slurry having hydroxyl into the aqueous magnesium chloride solution and reacting them with each other, the contents of trace components may be adjusted to predetermined ranges. For example, when calcium (Ca) is added, calcium in the form of oxide, hydroxide, carbonate salt, nitrate salt, sulfate salt, silicate salt and phosphate salt may be used. When phosphorus (P) is added, phosphoric acid, metaphosphoric acid, phosphonic acid and phosphorous acid, and alkali metal salts, alkaline earth metal salts and ammonium salts thereof may be used. When boron (B) is added, boric acid, alkali metal borate salts, ammonium borate salts, alkali metal metaborate salts, boron dioxide and the like may be used. When sulfur (S) is added, sulfuric acid and sulfurous acid, and alkali metal salts, alkaline earth metal salts and ammonium salts thereof may be used. When fluorine (F) is added, magnesium fluoride and the like may be used. When chlorine (Cl) is added, magnesium chloride and the like may be used. When silicon (Si) is added, alkali metal silicate salts, alkaline earth metal silicate salts and colloidal silica may be used.

The magnesium oxide of the present invention may contain trace components such as calcium (Ca), phosphorus (P), boron (B), sulfur (S), fluorine (F) and chlorine (Cl). When the magnesium oxide of the present invention contains calcium (Ca), the content of calcium is preferably 0.2 to 2.0 mass % in terms of CaO. When the magnesium oxide of the present invention contains phosphorus (P), the content of phosphorus is preferably 0.03 to 0.15 mass % in terms of $P_2O_3$. When the magnesium oxide of the present invention contains boron (B), the content of boron is preferably 0.04 to 0.15 mass %. When the magnesium oxide of the present invention contains sulfur (S), the content of sulfur is preferably 0.01 to 1.5 mass % in terms of $SO_3$. When the magnesium oxide of the present invention contains fluorine (F), the content of fluorine is preferably not more than 0.05 mass %. When the magnesium oxide of the present invention contains chlorine (Cl), the content of chlorine is preferably not more than 0.05 mass %. When the magnesium oxide of the present invention contains silicon (Si), the content of silicon is preferably 0.05 to 0.5 mass %. Here, "mass %" in the present specification means the same as "wt %".

The contents of trace components in the present invention may be also controlled by removing such components during the steps of production of a crude product. In such a case, the trace components may be removed by adding an acid during the aforementioned step of forming magnesium hydroxide, or by performing filtration and washing the product with water repeatedly after the aforementioned step of forming magnesium hydroxide.

In the case of washing with water, a trace component may be removed by washing the magnesium hydroxide with water, for example, chlorine (Cl) may be removed. In the case of reacting a magnesium chloride-containing aqueous solution with an alkaline aqueous solution having hydroxyl, a trace component such as boron (B) may be removed by reacting them with each other, precipitating part of magnesium hydroxide in advance and causing the precipitated particles to adsorb the trace component.

Further, the contents of trace components may be controlled before the final calcination of the product obtained such as magnesium hydroxide. In this case, they may be controlled by analyzing the magnesium hydroxide obtained to determine the contents of trace elements and supplementing any trace components or, if any trace elements are present in excessively large amounts, combining and mixing the magnesium hydroxide with other magnesium hydroxide having lower contents of such trace elements, followed by calcination.

The magnesium oxide of the present invention preferably has citric acid activity (CAA) of 50 to 170 seconds, and more preferably 60 to 90 seconds. Here, the citric acid activity (CAA) means the time required for a 0.4 N aqueous citric acid solution to reach the end of reaction when it is mixed with 40% final reaction equivalent of magnesium oxide and the mixture is stirred at a temperature of 303 K, that is, the time required for consuming the citric acid and neutralizing the solution.

The CAA empirically simulates the reactivity in the solid phase-solid phase reaction between silicon dioxide and magnesium oxide which actually occurs on the surface of an electromagnetic steel sheet, based on the solid phase-liquid phase reaction. The reactivity of magnesium oxide particles including primary particles can be thus measured.

When the CAA of the magnesium oxide is more than 170 seconds, the primary particle size of magnesium oxide is so large that the magnesium oxide particles exhibit low reactivity, causing a decrease in (a) forsterite film formation ratio. Further, residues will remain after removal with acids because of the particles being coarse. That is, (d) acid-removability is low.

When the CAA of the magnesium oxide is less than 50 seconds, the primary particle size of magnesium oxide is so small that the magnesium oxide particles show too high reactivity and fail to form a uniform forsterite film. Consequently, (b) film appearance and/or (c) adhesion of the forsterite film is deteriorated.

The grain-oriented electromagnetic steel sheet of the present invention may be manufactured by the following method. A steel sheet for the grain-oriented electromagnetic steel sheet may be manufactured by hot-rolling a silicon steel slab containing 2.5 to 4.5% silicon (Si), pickling the steel sheet, and adjusting the thickness of the steel sheet to a predetermined one by performing heavy cold-rolling or two passes of cold-rolling with intermediate annealing between the passes. Next, the coil of the cold-rolled steel sheet is subjected to recrystallization-annealing, which also serves as decarburization, in a wet hydrogen atmosphere at 923 to 1173 K. During this process, an oxide film based on silicon dioxide is formed on the surface of the steel sheet. Next, an annealing separator including the magnesium oxide for an annealing separator of the present invention is uniformly dispersed in water to give slurry. This slurry is continuously applied onto the surface of the oxide-coated steel sheet by roll coating or spray coating, and is dried at about 573 K. The thus-treated steel sheet is finish-annealed, for example, at 1473 K for 20.0 hours to form a forsterite film (a $Mg_2SiO_4$ film) on the steel sheet surface. The forsterite film is an insulating film, and also imparts tension to the surface of the steel sheet, and reduces the iron loss of the grain-oriented electromagnetic steel sheet to enhance magnetic properties.

EXAMPLES

The present invention will be described in detail based on Examples below. However, it should be construed that these Examples do not limit the scope of the invention in any way.
<Testing Methods>
(1) Method for Measuring BET Specific Surface Area The BET specific surface area was measured by a gas adsorption method (the BET method) using nitrogen gas and a specific surface area analyzer (Macsorb manufactured by Mountech Co., Ltd.).

(2) Method for Measuring Blaine Specific Surface Area

The Blaine specific surface area was measured in accordance with JIS R5201: 2015 (8. Fineness test, 8.1 Specific surface area test) using a Blaine air permeability apparatus (C-202B manufactured by Nishinihon Shikenki). The measurement was performed at room temperature 298±1 K, and the porosity was set at 0.80.
(3) Method for Measuring Boron (B) Content A measurement sample was added to 12 N hydrochloric acid (special grade chemical) and was completely dissolved by heating. The boron (B) content was then measured using an ICP optical emission spectrometer (PS3520 VDD manufactured by Hitachi High-Tech Science Corporation).
(4) Method for Measuring Chlorine (Cl) Content The content of chlorine (Cl) was measured by dissolving a sample into an acid and determining the mass with use of a spectrophotometer (UV-2550 manufactured by Shimadzu Corporation), thereby calculating the concentration in the sample.
(5) CAA Measurement Method $1\times10^{-4}$ $m^3$ 0.4 N citric acid solution and an appropriate amount ($2\times10^{-6}$ $m^3$) of 1% phenolphthalein solution as an indicator were added to a $2\times10^{-4}$ $m^3$ beaker. 40% Final reaction equivalent of magnesium oxide was added to the citric acid solution and the mixture was stirred with a magnetic stirrer at 700 rpm while controlling the liquid temperature at 303 K. The time required for the reaction to complete, that is, the time required for consuming the citric acid and neutralizing the solution was measured.
(6) Forsterite Film Formation Ratio In light of the mechanism of forsterite formation represented by the reaction formula: $2MgO+SiO_2 \rightarrow Mg_2SiO_4$, a mixture containing magnesium oxide powder and amorphous silicon dioxide in a molar ratio of 2:1 was prepared. The mixture weighing $0.8\times10^{-3}$ kg was molded under a pressure of 50 MPa, then a molded body having a diameter of $15\times10^{-3}$ m and a height of about $3\times10^{-3}$ m was obtained. Next, this compact was calcined in a nitrogen atmosphere at 1473 K for 4.0 hours. The amount of forsterite formed in the sintered body was quantitatively analyzed by X-ray diffractometry. It is likely that 90% or higher formation ratio indicates that the magnesium oxide has sufficient reactivity and will form a quality forsterite film.
(7) Appearance of Forsterite Film Samples for the testing of forsterite film appearance, forsterite film adhesion and acid-removability of unreacted magnesium oxide were supplied from a steel sheet which had been produced by hot-rolling and cold-rolling a silicon steel slab for a grain-oriented electromagnetic steel sheet in a known manner to a final thickness of $0.28\times10^{-3}$ m and thereafter subjecting the steel sheet to decarburization-annealing in a wet atmosphere containing 25% nitrogen plus 75% hydrogen. The chemical composition of the steel sheet before the decarburization-annealing included, in mass %, C: 0.01%, Si: 3.29%, Mn: 0.09%, Al: 0.03%, S: 0.07% and N: 0.0053%, the balance being Fe and inevitable impurities. Magnesium oxide was applied onto the electromagnetic steel sheet, and film characteristics of the forsterite film were examined. Specifically, the slurry of the magnesium oxide of the present invention or magnesium oxide of Comparative Example was applied to the steel sheet so that the dry mass would be $14\times10^{-3}$ kg·$m^{-2}$. After drying, final finish-annealing was performed at 1473 K for 20.0 hours. After the completion of the final finish-annealing, the steel sheet was cooled, washed with water, pickled with an aqueous hydrochloric acid solution, washed with water again, and dried. The appearance of the film was evaluated with respect to the film after the washing. Specifically, the appearance was evaluated as follows: ⊚ when a gray uniform forsterite film had been formed with a large thickness; ○ when the film was uniform but was slightly thin; Δ when the film was nonuniform and thin but covered the underlying steel sheet without exposure; and x when the film was nonuniform and very thin, and had portions where the underlying steel sheet were visibly exposed.

(8) Adhesion of Forsterite Film

The adhesion of forsterite film was evaluated based on the condition of the film before the washing. Specifically, the adhesion was evaluated as follows: ⊚ when the film was uniform and was free from separation; ○ when the film was slightly nonuniform but was free from separation; Δ when the film was nonuniform and had been exfoliated to leave pinholes; and x when the film was nonuniform and had been visibly exfoliated.

(9) Acid-Removability of Unreacted Magnesium Oxide

The acid-removability of unreacted magnesium oxide (also simply written as "acid-removability") was evaluated based on the condition of the film after the washing. Specifically, acid-removability was evaluated as follows: ⊚ when the unreacted magnesium oxide had been perfectly removed; ○ when the film had different color densities arising from slight residues of unreacted magnesium oxide, although no visible residues of unreacted magnesium oxide were present; Δ when there were visible dots of unreacted magnesium oxide; and x when the unreacted magnesium oxide visibly remained.

Synthetic Examples Using Reagents

Synthetic Example 1

Magnesium chloride (special grade chemical) was dissolved into pure water to give a $0.5 \times 10^3$ mol·m$^{-3}$ aqueous magnesium chloride solution. Next, calcium hydroxide (special grade chemical) was added to pure water to give a $0.5 \times 10^3$ mol·m$^{-3}$ calcium hydroxide dispersion. The aqueous magnesium chloride solution and the calcium hydroxide dispersion were mixed together to give $1.0 \times 10^{-3}$ m$^3$ of a mixture liquid containing $MgCl_2/Ca(OH)_2$ in a molar ratio of 1.1. Thereafter, an aqueous boric acid solution adjusted to $0.3 \times 10^3$ mol·m$^{-3}$ with pure water was added to the mixture liquid so that the boron (B) content in the final magnesium oxide would be 0.06 mass %. The reaction was performed at 363 K for 6.0 hours while stirring the mixture at 300 rpm with a four-blade stirrer, thus giving magnesium hydroxide slurry. Thereafter, the magnesium hydroxide slurry was filtered. The residue was washed with a 100-fold mass of pure water relative to the mass of the expected magnesium hydroxide, and was dried at 378 K for 12.0 hours to afford magnesium hydroxide powder. The magnesium hydroxide powder obtained was calcined with an electric furnace at 1073 K for 2.0 hours. Consequently, magnesium oxide having a Blaine specific surface area of $7.6 \times 10^3$ m$^2$·kg$^{-1}$ and a BET specific surface area of $29.2 \times 10^3$ m$^2$·kg$^{-1}$ was obtained.

Synthetic Example 2

Magnesium chloride (special grade chemical) was dissolved into pure water to give a $0.5 \times 10^3$ mol·m$^{-3}$ aqueous magnesium chloride solution. Next, calcium hydroxide (special grade chemical) was added to pure water to give a $0.5 \times 10^3$ mol·m$^{-3}$ calcium hydroxide dispersion. The aqueous magnesium chloride solution and the calcium hydroxide dispersion were mixed together to give $1.0 \times 10^{-3}$ m$^3$ of a mixture liquid containing $MgCl_2/Ca(OH)_2$ in a molar ratio of 1.1. Thereafter, an aqueous boric acid solution adjusted to $0.3 \times 10^3$ mol·m$^{-3}$ with pure water was added to the mixture liquid so that the boron content in the final magnesium oxide would be 0.06 mass %. The reaction was performed at 303 K for 6.0 hours while stirring the mixture at 300 rpm with a four-blade stirrer, thus giving magnesium hydroxide slurry. Thereafter, the magnesium hydroxide slurry was filtered. The residue was washed with a 100-fold mass of pure water relative to the mass of the expected magnesium hydroxide, and was dried at 378 K for 12.0 hours to afford magnesium hydroxide powder. The magnesium hydroxide powder obtained was calcined with an electric furnace at 1273 K for 0.5 hours to give magnesium oxide powder. The magnesium oxide obtained was crushed with a ball mill for 1.0 hour. Consequently, magnesium oxide having a Blaine specific surface area of $3.4 \times 10^3$ m$^2$·kg$^{-1}$ and a BET specific surface area of $25.6 \times 10^3$ m$^2$·kg$^{-1}$ was obtained.

Synthetic Example 3

Magnesium chloride (special grade chemical) was dissolved into pure water to give a $0.5 \times 10^3$ mol·m$^{-3}$ aqueous magnesium chloride solution. Next, calcium hydroxide (special grade chemical) was added to pure water to give a $0.5 \times 10^3$ mol·m$^{-3}$ calcium hydroxide dispersion. The aqueous magnesium chloride solution and the calcium hydroxide dispersion were mixed together to give $1.0 \times 10^{-3}$ m$^3$ of a mixture liquid containing $MgCl_2/Ca(OH)_2$ in a molar ratio of 1.1. Thereafter, an aqueous boric acid solution adjusted to $0.3 \times 10^3$ mol·m$^{-3}$ with pure water was added to the mixture liquid so that the boron content in the final magnesium oxide would be 0.06 mass %. The reaction was performed at 363 K for 5.5 hours while stirring the mixture at 600 rpm with a four-blade stirrer, thus giving magnesium hydroxide slurry. Thereafter, the magnesium hydroxide slurry was filtered. The residue was washed with a 100-fold mass of pure water relative to the mass of the expected magnesium hydroxide, and was dried at 378 K for 12.0 hours to afford magnesium hydroxide powder. The magnesium hydroxide powder obtained was calcined with an electric furnace at 1373 K for 2.0 hours. Consequently, magnesium oxide having a Blaine specific surface area of $1.4 \times 10^3$ m$^2$·kg$^{-1}$ and a BET specific surface area of $5.0 \times 10^3$ m$^2$·kg$^{-1}$ was obtained.

Synthetic Example 4

Magnesium chloride (special grade chemical) was dissolved into pure water to give a $0.5 \times 10^3$ mol·m–$^{3}$ aqueous magnesium chloride solution. Next, calcium hydroxide (special grade chemical) was added to pure water to give a $0.5 \times 10^3$ mol·m$^{-3}$ calcium hydroxide dispersion. The aqueous magnesium chloride solution and the calcium hydroxide dispersion were mixed together to give $1.0 \times 10^{-3}$ m$^3$ of a mixture liquid containing $MgCl_2/Ca(OH)_2$ in a molar ratio of 1.1. Thereafter, an aqueous boric acid solution adjusted to $0.3 \times 10^3$ mol·m$^{-3}$ with pure water was added to the mixture liquid so that the boron content in the final magnesium oxide would be 0.06 mass %. The reaction was performed at 313 K for 5.5 hours while stirring the mixture at 600 rpm with a four-blade stirrer, thus giving magnesium hydroxide slurry. Thereafter, the magnesium hydroxide slurry was filtered. The residue was washed with a 100-fold mass of pure water relative to the mass of the expected magnesium hydroxide, and was dried at 378 K for 12.0 hours to afford magnesium hydroxide powder. The magnesium hydroxide powder obtained was calcined with an electric furnace at 1273 K for 1.5 hours. Consequently, magnesium oxide having a Blaine specific surface area of $0.7 \times 10^3$ m$^2$·kg$^{-1}$ and a BET specific surface area of $23.8 \times 10^3$ m$^2$·kg$^{-1}$ was obtained.

Table 1 shows the components of the magnesium oxides of Synthetic Examples 1 to 4 produced from the reagents.

TABLE 1

|  | Blaine specific surface area ($10^3$m$^2$ · kg$^{-1}$) | BET specific surface area ($10^3$m$^2$ · kg$^{-1}$) | Chemical composition B (mass %) | Cl (mass %) |
|---|---|---|---|---|
| Syn. Ex. 1 | 7.6 | 29.2 | 0.055 | 0.023 |
| Syn. Ex. 2 | 3.4 | 25.6 | 0.064 | 0.024 |
| Syn. Ex. 3 | 1.4 | 5.0 | 0.054 | 0.029 |
| Syn. Ex. 4 | 0.7 | 23.8 | 0.060 | 0.026 |

Examples and Comparative Examples Using Reagents

Examples 1 to 3 and Comparative Examples 1 to 5

The magnesium oxides of Synthetic Examples 1 to 4 were mixed in accordance with the formulations shown in Table 2 to afford magnesium oxides of Examples 1 to 3 and Comparative Examples 1 to 5. The values of CAA of the magnesium oxides of Examples 1 to 3 and Comparative Examples 1 to 5 were all measured to be within the range of 60 to 90 seconds.

The magnesium oxides thus obtained were each applied to the decarburized and annealed steel sheet, and annealing was performed to form a forsterite film on the surface of the steel sheet. The steel sheets thus obtained were tested to evaluate the forsterite film formation ratio, the film appearance, the film adhesion and the acid-removability of unreacted magnesium oxide. The results are shown in Table 2.

In contrast, the forsterite films formed using the magnesium oxide (Comparative Examples 1 to 5) which had been obtained without adjusting the BET specific surface area and the Blaine specific surface area of magnesium oxide and consequently had a BET specific surface area and a Blaine specific surface area outside the predetermined ranges failed to satisfy any of the characteristics of forsterite film formation ratio, film appearance, film adhesion and acid-removability of unreacted magnesium oxide. The desired steel sheets were not obtained as a result.

Examples and Comparative Examples Using Other than Reagents

Example 4

An aqueous boric acid solution adjusted to $0.3 \times 10^3$ mol·m$^{-3}$ with pure water was added to bittern so that the boron content in the final magnesium oxide would be 0.07 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. The reaction was performed at 323 K for 7.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1273 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $3.8 \times 10^3$ m$^2$·kg$^{-1}$ and the BET specific surface area $18.6 \times 10^3$ m$^2$·kg$^{-1}$.

TABLE 2

|  | Compounding ratio | Blaine specific surface area ($10^3$m$^2$ · kg$^{-1}$) | BET specific surface area ($10^3$m$^2$ · kg$^{-1}$) | Forsterite formation ratio (%) | Film appearance | Adhesion | Acid-removability | Chemical composition B (mass %) | Cl (mass %) |
|---|---|---|---|---|---|---|---|---|---|
| Ex. 1 | Syn. Ex. 1:Syn. Ex. 3 (6:4) | 6.2 | 24.0 | 90.7 | ○ | ◎ | ◎ | 0.055 | 0.024 |
| Ex. 2 | Syn. Ex. 2:Syn. Ex. 4 (9:1) | 2.8 | 20.6 | 90.1 | ◎ | ◎ | ○ | 0.062 | 0.029 |
| Ex. 3 | Syn. Ex. 1:Syn. Ex. 3 (5:5) | 4.2 | 15.5 | 92.4 | ○ | ○ | ○ | 0.053 | 0.030 |
| Comp. Ex. 1 | Syn. Ex. 1 | 7.6 | 29.2 | 88.2 | X | Δ | ○ | 0.055 | 0.023 |
| Comp. Ex. 2 | Syn. Ex. 2 | 3.4 | 25.6 | 80.6 | Δ | ○ | ○ | 0.064 | 0.024 |
| Comp. Ex. 3 | Syn. Ex. 3 | 1.4 | 5.0 | 85.6 | Δ | Δ | X | 0.054 | 0.029 |
| Comp. Ex. 4 | Syn. Ex. 4 | 0.7 | 23.8 | 56.4 | X | Δ | X | 0.060 | 0.026 |
| Comp. Ex. 5 | Syn. Ex. 1:Syn. Ex. 3 (3:7) | 5.4 | 11.2 | 82.3 | ○ | ○ | ◎ | 0.052 | 0.028 |

As clear from Table 2, the forsterite films formed using the magnesium oxide (Examples 1 to 3) which had been synthesized from the reagents and had a BET specific surface area and a Blaine specific surface area within the predetermined ranges were uniform and sufficiently thick, and were excellent in all aspects of forsterite film formation ratio, film appearance, film adhesion and acid-removability of unreacted magnesium oxide.

Example 5

An aqueous boric acid solution adjusted to $0.3 \times 10^3$ mol·m$^{-3}$ with pure water was added to bittern so that the boron content in the final magnesium oxide would be 0.07 mass %. This bittern contained $2.0 \times 10^3$ mol·m$^{-3}$ magnesium ions. Calcium hydroxide slurry was added to the bittern so that the magnesium hydroxide concentration after the reaction would be $2.0 \times 10^3$ mol·m$^{-3}$. The reaction was performed at 353 K for 2.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1273 K for 2.0 hours to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $4.1 \times 10^3$ m$^2$·kg$^{-1}$ and the BET specific surface area $19.5 \times 10^3$ m$^2$·kg$^{-1}$.

Example 6

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $1.0 \times 10^3$ mol·m$^{-3}$. The reaction was performed at 333 K for 20.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1373 K for 0.5 hours to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $5.3 \times 10^3$ m$^2$·kg$^{-1}$ and the BET specific surface area $18.8 \times 10^3$ m$^2$·kg$^{-1}$.

Example 7

Calcium hydroxide was added to decarbonated seawater so that the magnesium hydroxide concentration after the reaction would be $0.05 \times 10^3$ mol·m$^{-3}$. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the mixture was filtered through a filter press. The residue was washed with water and dried to afford magnesium hydroxide. The magnesium hydroxide was calcined with a rotary kiln at 1373 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $3.1 \times 10^3$ m$^2$·kg$^{-1}$ and the BET specific surface area $15.0 \times 10^3$ m$^2$·kg$^{-1}$.

Example 8

Calcium hydroxide was added to decarbonated seawater so that the magnesium hydroxide concentration after the reaction would be $0.05 \times 10^3$ mol·m$^{-3}$. An aqueous boric acid solution adjusted to $0.3 \times 10^3$ mol·m$^{-3}$ with pure water was added to the seawater so that the boron content in the final magnesium oxide would be 0.06 mass %. The reaction was performed at 323 K for 20.0 hours to form magnesium hydroxide. 5.0 hours before the end of the reaction, 0.02 mass % polymer coagulant was added. Thereafter, the mixture was filtered through a filter press. The residue was washed with water and dried to afford magnesium hydroxide. The magnesium hydroxide was calcined with a rotary kiln at 1323 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $4.7 \times 10^3$ m$^2$·kg$^{-1}$ and the BET specific surface area $14.8 \times 10^3$ m$^2$·kg$^{-1}$.

Example 9

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $1.0 \times 10^3$ mol·m$^{-3}$. The reaction was performed at 333 K for 20.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1373 K for 0.75 hours to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $3.1 \times 10^3$ m$^2$·kg$^{-1}$ and the BET specific surface area $12.6 \times 10^3$ m$^2$·kg$^{-1}$.

Example 10

An aqueous boric acid solution adjusted to $0.3 \times 10^3$ mol·m$^{-3}$ with pure water was added to bittern so that the boron content in the final magnesium oxide would be 0.07 mass %. This bittern contained $2.0 \times 10^3$ mol·m$^{-3}$ magnesium ions. Calcium hydroxide slurry was added to the bittern so that the magnesium hydroxide concentration after the reaction would be $0.8 \times 10^3$ mol·m$^{-3}$. The reaction was performed at 333 K for 15.0 hours while stirring the mixture at 600 rpm. Thereafter, the mixture was filtered through a filter press. The residue was washed with water and dried to afford magnesium hydroxide. The magnesium hydroxide was calcined with a rotary kiln furnace at 1173 K for 1.5 hours to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $4.0 \times 10^3$ m$^2$·kg$^{-1}$ and the BET specific surface area $23.4 \times 10^3$ m$^2$·kg$^{-1}$.

Example 11

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $0.8 \times 10^3$ mol·m$^{-3}$. The reaction was performed at 363 K for 10.0 hours while stirring the mixture at 600 rpm. Thereafter, the mixture was filtered through a filter press. The residue was washed with water and dried to afford magnesium hydroxide. The magnesium hydroxide was calcined with a rotary kiln furnace at 1223 K for 1.5 hours to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $6.1 \times 10^3$ m$^2$·kg$^{-1}$ and the BET specific surface area $22.0 \times 10^3$ m$^2$·kg$^{-1}$.

Comparative Example 6

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $0.8 \times 10^3$ mol·m$^{-3}$. The reaction was performed at 333 K for 10.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1423 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $3.3 \times 10^3$ m$^2$·kg$^{-1}$ and the BET specific surface area $7.0 \times 10^3$ m$^2$·kg$^{-1}$.

Comparative Example 7

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $0.8 \times 10^3$ mol·m$^{-3}$. The reaction was performed at 353 K for 6.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1373 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $2.0 \times 10^3$ m$^2$·kg$^{-1}$ and the BET specific surface area $7.5 \times 10^3$ m$^2$·kg$^{-1}$.

Comparative Example 8

An aqueous boric acid solution adjusted to $0.3 \times 10^3$ mol·m$^{-3}$ with pure water was added to bittern so that the boron content in the final magnesium oxide would be 0.06 mass %. This bittern contained $2.0 \times 10^3$ mol·m$^{-3}$ magnesium ions. Calcium hydroxide slurry was added to the bittern so that the magnesium hydroxide concentration after the reaction would be $0.8 \times 10^3$ mol·m$^{-3}$. The reaction was performed at 343 K for 8.0 hours while stirring the mixture at 600 rpm. Thereafter, the mixture was filtered through a filter press. The residue was washed with water and dried to afford magnesium hydroxide. The magnesium hydroxide was calcined with a rotary kiln at 1473 K for 1.0 hour to give magnesium oxide powder. The magnesium oxide obtained was crushed with an impact crusher (a jet mill) to adjust the Blaine specific surface area and the BET specific surface area to the predetermined ranges. The final magnesium oxide was analyzed, and the Blaine specific surface area was measured to be $1.2 \times 10^3$ m$^2$·kg$^{-1}$ and the BET specific surface area $5.0 \times 10^3$ m$^2$·kg$^{-1}$.

Table 3 shows the Blaine specific surface areas and BET specific surface areas of the magnesium oxides of Examples 4 to 11 and Comparative Examples 6 to 8 obtained as described above.

The magnesium oxides of Examples 4 to 11 and Comparative Examples 6 to 8 were each applied to the decarburized and annealed steel sheet, and finish-annealing was performed to form a forsterite film on the surface of the steel sheet. The steel sheets thus obtained were tested to evaluate the forsterite film formation ratio, the film appearance, the film adhesion, and the acid-removability of unreacted magnesium oxide. The results are shown in Table 3. The values of CAA of the magnesium oxides of Examples 4 to 11 and Comparative Examples 6 to 8 were all measured to be within the range of 60 to 90 seconds.

TABLE 3

| | Blaine specific surface area ($10^3$m$^2$·kg$^{-1}$) | BET specific surface area ($10^3$m$^2$·kg$^{-1}$) | Forsterite formation ratio (%) | Film appearance | Adhesion | Acid-removability | Chemical composition | |
|---|---|---|---|---|---|---|---|---|
| | | | | | | | B (mass %) | Cl (mass %) |
| Ex. 4 | 3.8 | 18.6 | 92.4 | ◎ | ◎ | ◎ | 0.078 | 0.020 |
| Ex. 5 | 4.1 | 19.5 | 91.8 | ◎ | ○ | ○ | 0.080 | 0.020 |
| Ex. 6 | 5.3 | 18.8 | 90.3 | ◎ | ◎ | ○ | 0.060 | 0.027 |
| Ex. 7 | 3.1 | 15.0 | 91.3 | ○ | ◎ | ◎ | 0.067 | 0.020 |
| Ex. 8 | 4.7 | 14.8 | 94.2 | ◎ | ◎ | ○ | 0.061 | 0.022 |
| Ex. 9 | 3.1 | 12.6 | 91.2 | ○ | ○ | ○ | 0.065 | 0.028 |
| Ex. 10 | 4.0 | 23.4 | 92.0 | ◎ | ◎ | ○ | 0.077 | 0.021 |
| Ex. 11 | 6.1 | 22.0 | 90.2 | ◎ | ○ | ○ | 0.064 | 0.020 |
| Comp. Ex. 6 | 3.3 | 7.0 | 92.2 | Δ | X | Δ | 0.062 | 0.027 |
| Comp. Ex. 7 | 2.0 | 7.5 | 87.7 | X | Δ | Δ | 0.061 | 0.025 |
| Comp. Ex. 8 | 1.2 | 5.0 | 85.4 | X | X | Δ | 0.060 | 0.026 |

As clear from Table 3, the forsterite films formed using the magnesium oxides (Examples 4 to 11) which had been synthesized from seawater and bittern, industrial raw materials, and had a BET specific surface area and a Blaine specific surface area within the predetermined ranges were shown to be excellent in (a) forsterite film formation ratio (90% or higher). Further, they were clearly shown to be excellent in all other aspects of (b) film appearance, (c) film adhesion and (d) acid-removability of unreacted magnesium oxide.

In contrast, the forsterite films formed using the magnesium oxides (Comparative Examples 6 to 8) which had been obtained without adjusting the BET specific surface area and the Blaine specific surface area of magnesium oxide and consequently had a BET specific surface area and a Blaine specific surface area outside the predetermined ranges failed to satisfy any of the characteristics of (a) forsterite film formability (forsterite film formation ratio), (b) film appearance, (c) film adhesion and (d) acid-removability of unreacted magnesium oxide. The desired steel sheets were not obtained as a result.

From the above, it has been demonstrated that the magnesium oxide for an annealing separator of the present invention allow for the manufacturing of a grain-oriented electromagnetic steel sheet having excellent insulating properties and magnetic properties.

The invention claimed is:

1. Magnesium oxide for an annealing separator having a BET specific surface area of $15.5 \times 10^3$ to $25.0 \times 10^3$ $m^2 \cdot kg^{-1}$ and a Blaine specific surface area of $3.8 \times 10^3$ to $7.0 \times 10^3$ $m^2 \cdot kg^{-1}$.

2. The magnesium oxide for an annealing separator according to claim 1, wherein the magnesium oxide contains 0.04 to 0.15 mass % boron and has a chlorine content of not more than 0.05 mass %.

3. An annealing separator comprising the magnesium oxide for an annealing separator according to claim 1.

4. An annealing separator comprising the magnesium oxide for an annealing separator according to claim 2.

* * * * *